Nov. 19, 1957  O. H. LIND  2,813,537
AROMATIC BEVERAGE BAR
Filed Sept. 15, 1953
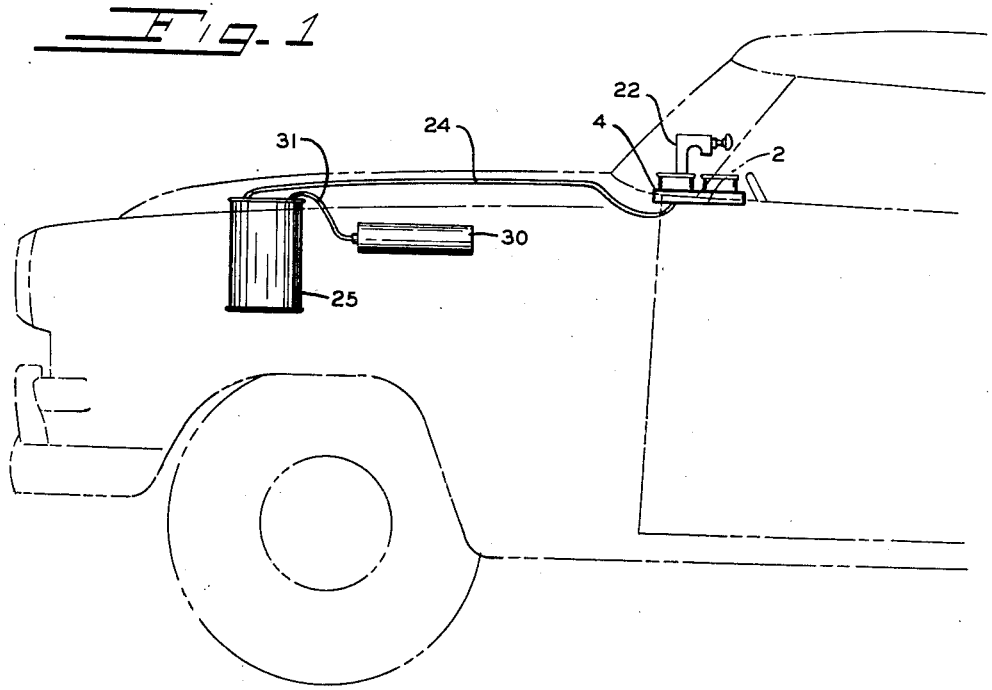
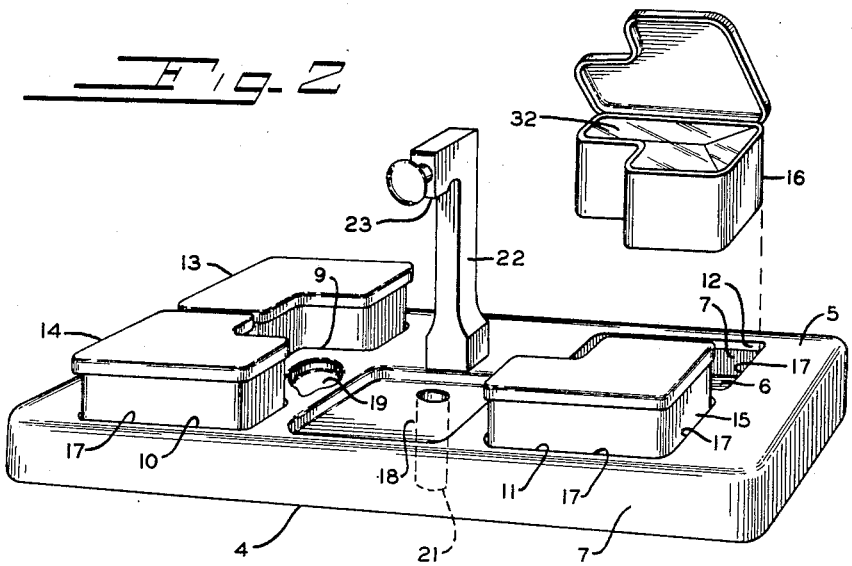
INVENTOR.
OTTO H. LIND
BY
DES JARDINS, ROBINSON & KEISER
HIS ATTORNEYS

United States Patent Office 2,813,537
Patented Nov. 19, 1957

2,813,537

AROMATIC BEVERAGE BAR

Otto H. Lind, Cincinnati, Ohio, assignor to Lind Industries, Inc., a corporation of Ohio Application September 15, 1953, Serial No. 380,169

9 Claims. (Cl. 137—353)

This invention relates to an aromatic beverage bar, and it more particularly pertains to a bar associated with that inside portion of the cowl of a motor vehicle which is above the instrument panel in a position to be readily accessible to the front seat occupant or occupants, especially the operator.

This beverage bar is of simple compact construction with receptacles for such aromatic beverages as coffee and tea as well as for those condiments that are commonly used with these beverages. An electrically heated water tank, electrically connected with the storage battery of the vehicle, is provided for the beverage bar, the water therein being forced from the tank through a nozzle by means of air pressure built up in said tank by a conventional pump means.

The beverage bar may be formed as an integral part of the cowl portion or as a separately formed part attached to said cowl portion. Several containers or receptacles are carried by the beverage bar, each being of a configuration of one of the container or receptacle receiving recesses formed in the top side of the bar. A water spigot is provided, connected to a thermo-insulated water supply tank mounted on some part of the vehicle body, preferably beneath the hook in front of the cowl, to overhang another recess formed in the top side of the beverage bar and having a drain conduit or spout connected thereto. One or more other recesses may be formed in the top side of the bar in a form generally conforming to the bowl of a spoon so that one or more spoons may be laid on the bar and retained in place.

One of the main objects of the invention is an aromatic beverage bar especially adapted for use in a motor vehicle.

Another object of the invention is a beverage bar which is simple and compact in construction.

Another object of the invention is a beverage bar that is arranged in a position readily accessible to the operator.

A still further object of the invention is a beverage bar having a water supply connection.

Further objects, and objects relating to details of construction and economies of operation, will readily appear from the detailed description to follow. In one instance I have accomplished the objects of my invention by the device and means set forth in the following specification. My invention is clearly defined and pointed out in the appended claims. A structure constituting a preferred embodiment of my invention is illustrated in the accompanying drawings, forming a part of this specification, in which:

Fig. 1 is a diagrammatic view showing the water tank and its connection with the beverage bar.

Fig. 2 is a perspective view of a beverage bar embodying the invention.

Referring specifically to the drawings in which like numerals designate like parts, numeral 2 is that portion of the cowl which is within the car and immediately over the instrument panel. The beverage bar 4 is formed as a part of the cowl or as a unit attached thereto.

In the embodiment shown in the drawing, the beverage bar 4 is a separate member, in the form of a tray, seated upon the top of the cowl portion and affixed thereto by the water supply fitting hereinafter described. The tray is in the form of a rectangular block having a top side 5 and bottom side 6 connected by a surrounding side wall resulting from nested flanges 7, one flange being formed on each of the sides 5 and 6. The block may be made in any suitable manner and of any material, such as molded plastic, metal, wood or the like. It can be made in a single piece or a plurality of sections, one section being a floor or bottom piece nested within the surrounding flange 7 of the top piece in which the hereinafter recesses are formed.

The top side 5 of the tray or block is provided with a plurality of recesses, preferably four, these being in the form of L-shaped recesses 9, 10, 11 and 12, each being adjacent to one of the corners of the block. Containers or receptacles 13, 14, 15 and 16 are provided, each being L-shaped to conform to the configuration of the L-shaped recesses so as to permit said containers fitting snugly within the recesses. The long or outer side 17 of each of the recesses is next adjacent one of the corners of the block.

There is another recess 18 formed in the top side 5 of the block between two of the receptacle receiving recesses 10 and 11 and extending from a point closely adjacent one longitudinal edge to about the middle of the block. Other recesses 19 are formed in the top side of the block, these being of the general shape of the bowl of a spoon. There is a drain pipe 21 leading from the bottom of the recess 18 to a point of discharge beneath the motor vehicle.

A water supply is provided for the beverage bar by means of a water conduit pedestal 22 having a spigot 23 on one end overhanging the recess 18 and connected at its opposite end to one end of a tube 24 leading to a thermoinsulated water tank 25, mounted on the motor body by a bracket beneath the hood. The tank is provided with a conventional electrical heating element wired to the storage battery of the motor vehicle.

The beverage bar can be secured in position on the cowl by the pedestal of the water conduit 22 that is clamped in place, it having a projecting threaded portion extending through a performation in the beverage bar or block and another perforation in the cowl to receive a clamping nut. Ordinarily this clamp means is sufficient for holding the beverage bar in place, although it may be additionally secured by conventional clamp bolts extending through the block and the cowl.

A conventional air pump 30 manually operated, is provided in an accessible position on the cowl or panel and connected by a tube 31 to the water tank to pump air therein under pressure for dispensing the water from the tank by pressure.

It will be understood that any conventional means can be provided for filling the water tank. Moreover, the containers for the beverages are not limited to any particular form or shape. One is provided for coffee, another for tea, and others for sugar and powdered milk. They are of a shape to be snugly seated in the recesses, and are preferably non-circular so as to be prevented from turning in the sockets of the bar tray.

Packaged units 32 of tea, coffee and sugar are specially made for the serving bar, each package being of a cross-sectional shape conforming to that of one of the containers so that it can be placed therein. Instant coffee and tea packages are sometimes provided with powdered sugar already mixed therewith. The package is of any suitable material, such as paper or cardboard, which is inherently moisture proof or treated to be of that character. With the package unit shaped to conform to the containers, such units will be held in place without rattling and can be placed in the containers prepared ready for subsequent use.

While the bar has been shown in connection with the cowl of a motor vehicle, especially convenient for the vehicle operator, its use is not, of course, thus restricted. It is likewise useful for serving passengers on planes, railway vehicles and the like.

I am aware that there may be various changes in details of construction without departing from the spirit of my invention, and therefore, I claim my invention broadly as indicated by the appended claims.

Having thus described my invention, what I claim as new and useful and desire to secure by U. S. Letters Patent, is:

1. In a motor vehicle having a cowl with a portion thereof projecting into the driver's compartment, an aromatic beverage bar comprising a serving tray fixed to the top of the projecting cowl portion provided with recesses for a plurality of containers, a plurality of containers, each of a configuration conforming to one of the recesses, a water spigot having a supply conduit connected to a water tank, a recess in the tray beneath the spigot, and a water drain from the latter recess.

2. The aromatic beverage bar of claim 1 having one or more spoon receiving recesses provided therein.

3. In a motor vehicle having a cowl with a portion thereof projecting into the driver's compartment, an aromatic beverage bar fixed to the top of the projecting cowl portion comprising a serving tray having a top and bottom side, a plurality of recesses formed in the top side of the tray, a plurality of containers, each of a configuration conforming to one of the recesses, a water spigot having a supply conduit connected to a water tank, a recess in the tray beneath the spigot, and a water drain from said latter recess.

4. The aromatic beverage bar of claim 3 having one or more spoon receiving recesses provided therein.

5. In combination with a motor vehicle, an aromatic beverage bar comprising a serving tray forming a part of the cowl, a plurality of recesses formed in the tray, a plurality of containers, each of a configuration conforming to one of the recesses, a water tank mounted on the motor, a water spigot fixed to the tray and connected to the water tank, a recess formed in the tray beneath the spigot, and a water drain for the last mentioned recess.

6. The combination of claim 5 in which the tray is provided with a top and bottom side and the recesses are formed in the top side of said tray.

7. The combination of claim 6 in which each of the containers are generally L-shaped and with the long sides of the L disposed adjacent the corner of the tray.

8. In a motor vehicle having a cowl with a portion thereof projecting into the driver's compartment, the combination of a serving receptacle fitted to the top of the projecting cowl portion and having a non-circular recess formed therein and a packaged beverage, the recess of said serving receptacle and packaged beverage being of the same non-circular configuration so that the packaged beverage can be nested in the recess of the serving receptacle.

9. In a motor vehicle, the combination of claim 8 including also a non-circular recess in the serving receptacle for a food package unit and a food package unit of non-circular configuration conforming to that of a non-circular recess in the serving receptacle whereby the food package unit is adapted to be nested in the food package unit receiving recess of the serving receptacle.

References Cited in the file of this patent

UNITED STATES PATENTS

| | | |
|---|---|---|
| 135,617 | Andrews | Feb. 11, 1873 |
| 214,925 | Kreig et al. | Apr. 29, 1879 |
| 692,523 | Kammerer | Feb. 4, 1902 |
| 707,905 | Conover | Aug. 26, 1902 |
| 2,014,745 | Regli | Sept. 17, 1935 |
| 2,032,722 | Schwab | Mar. 3, 1936 |
| 2,319,422 | Maihack | May 18, 1943 |
| 2,533,881 | Duff | Dec. 12, 1950 |
| 2,661,015 | Allred et al. | Dec. 1, 1953 |
| 2,672,182 | Gwin et al. | Mar. 16, 1954 |
| 2,680,802 | Bremer | June 8, 1954 |
| 2,682,976 | Melikian et al. | July 6, 1954 |
| 2,695,238 | Ferguson | Nov. 23, 1954 |
| 2,697,531 | Hood | Dec. 21, 1954 |